MAGNETIC CORE CONVERGING SWITCH

Filed Nov. 30, 1962 2 Sheets-Sheet 1

INVENTORS J. N. BROWN, JR.
E. E. NEWHALL
BY Lucian C. Canepa
ATTORNEY

MAGNETIC CORE CONVERGING SWITCH

Filed Nov. 30, 1962 2 Sheets-Sheet 2

INVENTORS J. N. BROWN, JR.
E. E. NEWHALL
BY Lucian C. Canepa
ATTORNEY

United States Patent Office 3,457,553

Patented July 22, 1969

3,457,553

MAGNETIC CORE CONVERGING SWITCH

James N. Brown, Jr., Hillsboro, N.C., and Edmunde E. Newhall, Brookside, N.J., assignors to Bell Telephone Laboratories, Incorporated, New York, N.Y., a corporation of New York Filed Nov. 30, 1962, Ser. No. 241,442

Int. Cl. G11b *5/14, 5/16*

U.S. Cl. 340—174 22 Claims

This invention relates to a magnetic core circuit and, more specifically, to a multiapertured magnetic core arrangement which functions as a converging switch.

Electronic circuits which supply a selected one of a plurality of groups of information digits to a common set of output terminals are well known. Perhaps the most common and extensively employed of such circuits is the word-organized, random-accessed, information storage memory. Typically, digital information is supplied to a store during a write-in process and is stored at discrete address locations in binary memory elements, such as tunnel diodes and square loop magnetic elements. When the stored information is desired, the corresponding address is interrogated, and the information word stored thereat is supplied to a common set of output terminals. A new write-in cycle may or may not be required depending upon whether the interrogation process is of the destructive or nondestructive type, respectively.

However, where the input information which is represented by the digit values included in the plurality of stored information words is continuously changing, a storage memory often fails to render satisfactory performance. In response to each binary input information digit change, the store must initiate a new write-in cycle, and the store cannot be interrogated during this period. This becomes an especially serious limitation when the number of information digits becomes relatively large. By employing a converging switch in place of the information store, however, the input information may be continuously interrogated virtually independent of the rate of change of the input digit values.

It is thus an object of the present invention to provide an improved magnetic converging switch.

More specifically, an object of the present invention is the provision of a multiapertured core converging switch wherein a selected one of a plurality of groups of information bits is supplied to a common set of output terminals.

It is another object of the present invention to provide a multiapertured core converging switch which supplies a common set of output terminals with one of a plurality of groups of information bits which may be continuously varying.

It is still another object of the present invention to provide a multiapertured core converging switch which does not utilize either temporary or permanent storage of the input information.

These and other objects of the present invention are realized in the specific illustrative, magnetic converging switch employing a plurality of square loop, ferromagnetic, multiapertured cores. Each core includes two driving legs, each shunted by a magnetic member of a like flux-carrying capacity. Two cross legs are provided to complete a magnetic path which also includes the driving legs. Each cross leg member has a uniform flux capacity which is twice the magnitude of that possessed by each of the driving and shunt legs, and a plurality of apertures are centrally located along the long axis of each cross leg.

Coupled to each aperture is an input winding and an output winding which links the ferromagnetic material on each side of the aperture in an opposite polarity. Output windings respectively coupled to corresponding apertures on the cores are serially connected together to form a plurality of output circuits. Binary input information is manifested by the presence or absence of an input current supplied to a corresponding input winding.

Bias windings are provided to saturate each core to a remanent hysteresis state. One of the plurality of cores is interrogated by reversing the flux in both of its driving legs thereby creating a neutral magnetic condition in the cross leg members. A zero net output voltage is induced in an output winding, and thereby also in an output circuit, when the corresponding input winding is de-energized. Conversely, an output voltage is generated in an output winding, and the corresponding output circuit, associated with an energized input winding.

It is thus a feature of the present invention that a magnetic core converging switch include a plurality of multiapertured, ferromagnetic, square loop cores, each core including two driving legs and two cross legs each connected to both of the driving legs thereby forming a closed magnetic path, each of the cross legs including a plurality of apertures centrally located thereon.

It is another feature of the present invention that a magnetic core converging switch include a plurality of multiapertured, square loop, ferromagnetic cores, each core including a cross leg and a driving leg which completes a closed magnetic path which includes the cross leg, and that the switch further include a plurality of apertures included in the cross leg, and a plurality of input and output windings, each of the input and output windings being coupled to a different one of the cross leg apertures, each output winding being coupled to the ferromagnetic material of either side of the corresponding aperture in an opposite polarity.

A complete understanding of the present invention and of the above and other features, variations and advantages thereof may be gained from a consideration of the following detailed description of an illustrative embodiment thereof presented hereinbelow in conjunction with the accompanying drawing, in which.

Figure 1:
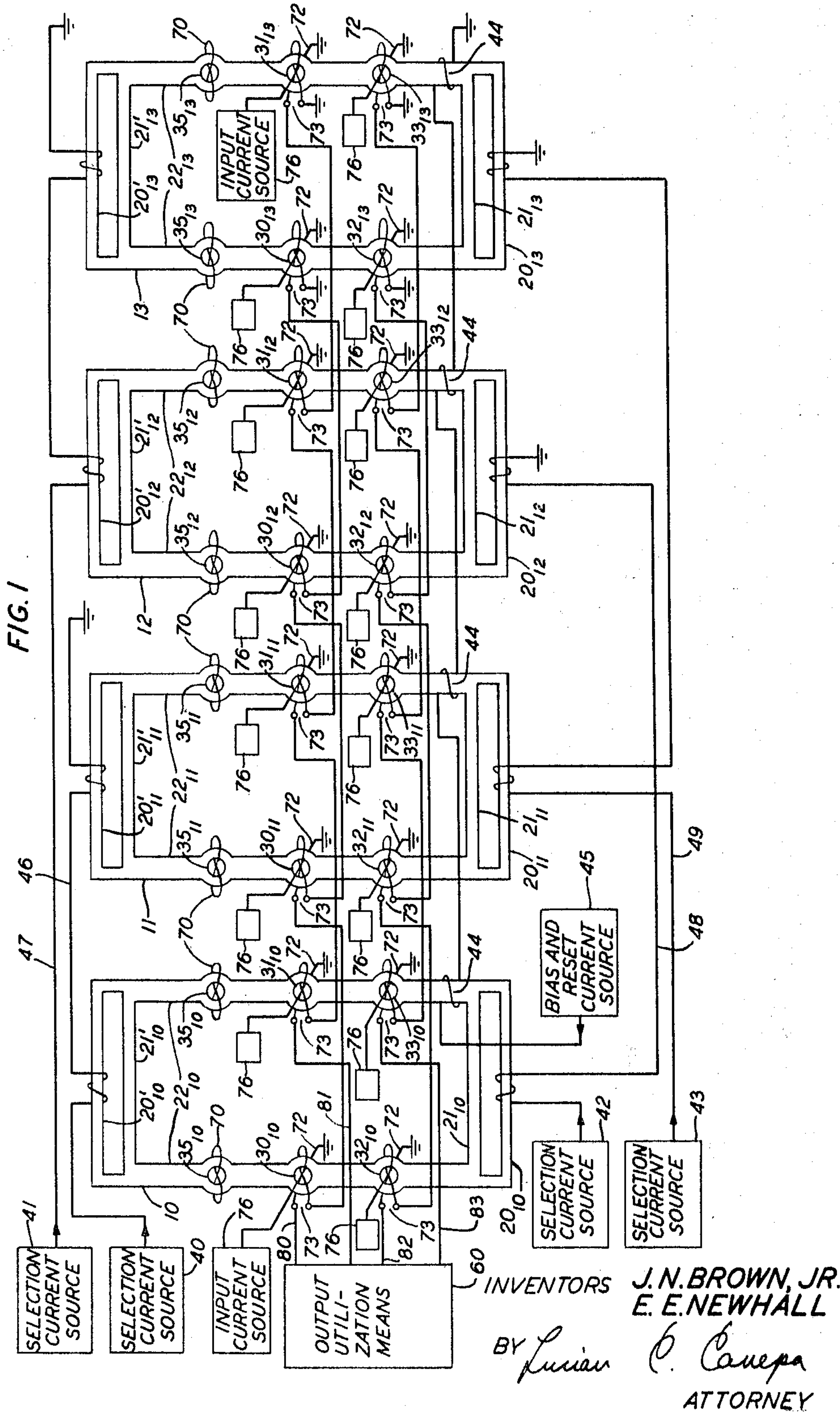
FIG. 1 is a diagram of a specific illustrative multiapertured core converging switch which embodies the principles of the present invention.

Referring now to FIG. 1, there is shown a specific, illustrative magnetic core converging switch which includes four multiapertured, square loop, ferromagnetic cores 10 through 13. Each core includes two driving legs 20 and 20', each connected in parallel with a shunt leg 21 and 21', respectively. Two cross legs 22 are provided each connecting a junction of the driving leg 20 and the shunt leg 21 which the corresponding junction of the legs 20' and 21'. Each of the cross legs 22 has a uniform cross-sectional area which is twice the magnitude of that possessed by each of the driving legs 20 and 20' and the shunt legs 21 and 21', all of the aforementioned magnetic legs having a like value of remanent saturation. Hence, each of the cross legs 22 has twice the flux carrying capacity of either of the driving legs 20 and 20' or the shunt legs 21 and 21'.

A plurality of signal apertures 30 through 33 are centrally located on the long axes of the cross legs 22 included in each of the cores 10 through 13. In addition, a control aperture 35 is also centrally located on each of the cross legs 22. Coupled to each of the signal apertures 30 through 33 is an input winding 72 and an output winding 73 which links the ferromagnetic material on each side of the aperture in an opposite polarity. The output windings coupled to corresponding ones of the apertures 30 through 33 included in each of the cores 10 through 13 are respectively interconnected to form output circuits 80 through 83 which are each grounded at one end and connected at their other ends to an output utilization means 60. Linked to each of the control apertures 35 included in each of the cores 10 through 13 is a short-circuited control winding 70 which is coupled to the material on either side of the corresponding aperture 35 in an opposite polarity. The function of the apertures 35 and windings 70 will be discussed hereinafter.

A plurality of input current sources 76 are provided in the illustrative embodiment shown in FIG. 1, each of the sources 76 being connected to a different one of the input windings 72. The sources 76 supply continuous monopolar currents to selected ones of the input windings 72, with binary input information being manifested by either the presence or absence of an input current. The input sources 76 might comprise, for example, a plurality of control circuit output signals, or currents representative of a plurality of binary information bits from a computer or switching system.

It is noted at this point that each one of a plurality of the circuit elements identified above is additionally designated by one of the subscripts 10 through 13 indicating the particular core of the plurality 10 through 13 with which it is associated. Hence, for example, the leg $\mathbf{21'_{12}}$ corresponds to the shunt leg 21' which is included in the multi-apertured core 12.

A biasing and resetting winding 44 is coupled to a cross leg 22 included in each of the cores 10 through 13. The individual windings 44 are serially interconnected and further connected to a bias current source 45 which supplies a current in a polarity to saturate each of the cores 10 through 13 in a clockwise manner.

Selection of an individual core is accomplished by a plurality of current sources 40 through 43 and a plurality of selection windings 46 through 49 which are coupled to the cores 10 through 13 in a polarity opposite to the bias windings 44 thereon. The selection winding 46 is coupled to the driving leg 20' included in each of the cores 10 and 11 and is connected to the current source 40, and the winding 47 is coupled to the driving legs $\mathbf{20'_{12}}$ and $\mathbf{20'_{13}}$ and connected to the current source 41. Similarly, the selection windings 48 and 49 are respectively connected to current sources 42 and 43 and coupled to the driving legs $\mathbf{20_{10}}$ and $\mathbf{20_{12}}$, and $\mathbf{20_{11}}$ and $\mathbf{20_{13}}$. Each of the sources 40 through 43 supplies a current of an insufficient magnitude to switch the remanent hysteresis state of a particular ferromagnetic core when only one of the selection windings coupled to the core is energized. When a core is simultaneously coupled to two energized selection windings, however, the core will switch its remanent condition.

Before describing a typical sequence of circuit operation, the convention employed in FIGS. 2 and 3 to illustrate the magnetic condition of the ferromagnetic core legs will be described. Each vector therein represents a measure of magnetic flux, with a larger vector representing proportionally more flux than a shorter vector. The total additive length of the vectors contained in any particular magnetic member indicates the flux carrying capacity of the member and hence remains constant. The legs 20 and 20' and 21 and 21' will in every case have flux vectors whose total length is two flux units while each of the cross legs 22 has flux vectors whose total length is four units. Accordingly, a total vector length of two flux units is contained in the ferromagnetic material on each side of each of the signal apertures 30 through 33 and the control apertures 35. Where all the vectors in any magnetic member have a like orientation, the fluxes are additive and the material is in a remanent saturation condition. When two vectors are of opposite polarities, the longer of the vectors depicts the direction of flux flowing through the corresponding member, and the flux has a magnitude proportional to the vector difference. When the flux vectors have a net zero difference, the associated material is magnetically neutral thereby having no magnetic lines of flux flowing therethrough.

Illustrating a typical cycle of circuit operation for the FIG. 1 arrangement, assume the source 45 supplies a current to each of the bias and reset windings 44 coupled to one of the cross legs 22 included in each of the cores 10 through 13. The energized bias windings 44 saturate each of the cores 10 through 13 in a clockwise remanent polarity, as shown in FIG. 2. Note in FIG. 2, that the number of lines of flux flowing through all cross sections of any one of the members 20, 20', 21, 21' and 22 is identical, and that flux is conserved in each junction between any of the members. Hence, the fundamental physical principle that lines of flux be continuous is satisfied.

Assume now that it is desired to select the core 11 and thereby to determine the condition of the input current sources 76 which are associated with the signal apertures $\mathbf{30_{11}}$ through $\mathbf{33_{11}}$. Assume further, that the sources 76 associated with the apertures $\mathbf{31_{11}}$ and $\mathbf{32_{11}}$ are each supplying a monopolar input current, while the sources 76 associated with the apertures $\mathbf{30_{11}}$ and $\mathbf{33_{11}}$ are not supplying an input current.

To select the core 11, the current source 40 supplies a current to the winding 46 coupled to the leg $\mathbf{20'_{11}}$ and the current source 43 supplies a current to the selection winding 49 which is coupled to the driving leg $\mathbf{20_{11}}$. Under these conditions, the core 11 is the only one of the cores 10 through 13 to receive a coincident energization, and it alone will alter its magnetic condition.

Figure 2:
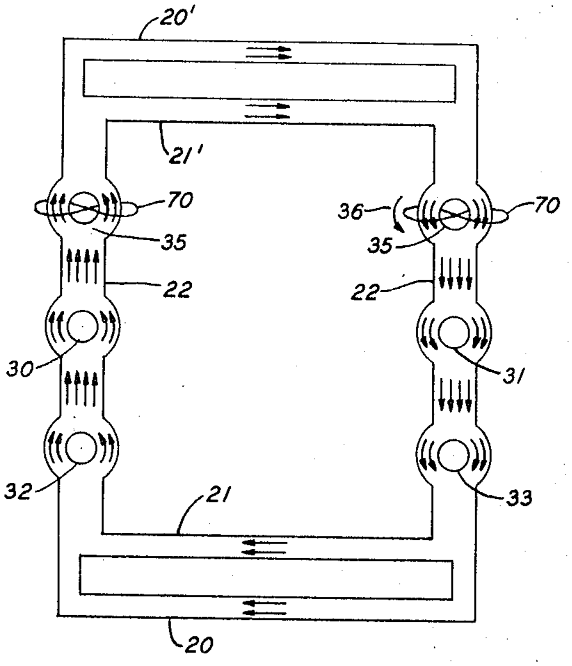
FIG. 2 is a diagram of a first magnetic condition for one of the multiapertured cores illustrated in FIG. 1.
Figure 3:
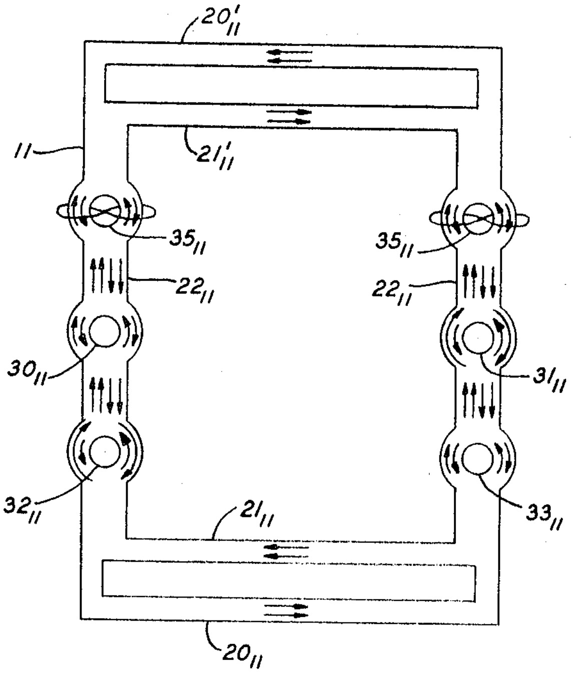
FIG. 3 is a diagram of a second magnetic condition for a particular multiapertured core illustrated in FIG. 1.

The magnetizing force created by the energized selection windings 46 and 49 reverses the remanent hysteresis magnetization orientation in the driving leg 20 from its previous right-to-left direction illustrated in FIG. 2 to a left-to-right orientation illustrated in FIG. 3. Similarly, the driving leg 20' switches its flux orientation and resides in a right-to-left condition as shown in FIG. 3. Note that two units of flux now flow from left-to-right in the leg $\mathbf{20_{11}}$ and return right-to-left in the shunting leg $\mathbf{21_{11}}$. Also note that two units of flux flow in a closed magnetic path including the driving leg $\mathbf{20'_{11}}$ and the shunt leg $\mathbf{21'_{11}}$. It should be apparent that the energized selection windings 46 and 49 must also supply a switching magnetizing force to reverse two flux units in the cross legs 22 as no net flux can exist in either of these members under the above-described magnetic state of the driving legs $\mathbf{20_{11}}$ and $\mathbf{20'_{11}}$ and shunt legs $\mathbf{21_{11}}$ and $\mathbf{21'_{11}}$. If any flux were contained in either of the legs 22 it would have to be returned through either a driving leg or a shunt leg, as lines of flux must be continuous as mentioned above. However, each of the driving legs 20 and 20' and shunt legs 21 and 21' is in a saturated condition and, moreover, the driving leg 20 and shunt leg 21, and the driving leg 20' and shunt leg 21', already have two continuous units of flux flowing therethrough in two closed, completed magnetic paths. Hence, each of the cross legs 22 is driven by the selection energization from a saturation condition to a neutral condition as illustrated in FIG. 3.

The input winding 72 passing through the aperture $\mathbf{30_{11}}$ is not energized and therefore does not supply an external magnetomotive force to effect the flux change in the ferromagnetic material surrounding this aperture. Hence, the material on each side of the aperture $\mathbf{30_{11}}$ switches one of the two flux units which must be switched in the cross leg 22 and is driven from the previous saturated condition to an unmagnetized state. Similarly, the ferromagnetic material surrounding the aperture $\mathbf{33_{11}}$, which is also coupled to an unenergized input winding 72, is demagnetized.

However, the input current source 76 does supply a current to the input winding 72 passing through the aperture $\mathbf{31_{11}}$ which generates a magnetizing force tending to produce clockwise flux around the aperture $\mathbf{31_{11}}$. This magnetizing force aids the selection winding magnetomotive force in the core material to the left of the aperture, while opposing the magnetizing force to the right of the aperture $31_{11}$. It is a well known physical principle of magnetics that the speed of domain wall motion, and thereby also the speed of square loop magnetic switching, is directly proportional to the applied magnetizing force. Therefore, since a larger force is applied to the material to the left of the aperture $31_{11}$ than to the right of this aperture, the left portion of the material switches at a more rapid rate of speed. Since the total flux switched in the material on both sides of the aperture is constrained to be two flux units, a greater portion of these two flux units is switched in the faster-switching left-hand material than in the right-hand material, resulting in a magnetization condition illustrated in FIG. 3. Also, the material surrounding the aperture $32_{11}$ resides in a similar state of magnetization, as the input winding 72 passing through this aperture is also supplied with an input current.

As mentioned above, each of the output windings 73 is coupled to the material on either side of the corresponding core aperture in an opposite polarity. Hence, the signals induced by the switching of flux in the material on either side of a cross leg aperture have a cancelling effect on one another. Hence, as the material on either side of the apertures $30_{11}$ and $33_{11}$ has the same amount of flux switched therein, the total voltage induced in the output windings 73 coupled to the apertures $30_{11}$ and $33_{11}$ has a net value of zero. As the remaining output windings 73 coupled to the apertures 30 and 33 contained in the other cores 10, 12 and 13 also, of course, have no voltages induced therein, the output circuits 80 and 83 also have no net signal generated therein.

With respect to the aperture $31_{11}$, however, note that a larger flux change has occurred in the material to the left of this aperture than transpired in the material to the right. Hence, the left-hand material induces a larger signal in the output winding 73 coupled to the aperture $31_{11}$ than does the right-hand material, which undergoes a smaller flux change. Hence, the two induced signals do not fully cancel, and a net voltage is induced in the associated output winding 73 and thereby also in the output circuit 81. Similarly, the output winding 73 coupled to the aperture $32_{11}$, and thereby also the output circuit 82, have a net voltage induced therein. Hence, the output circuits 80 and 83 are unenergized, which corresponds to the input sources 76 associated with the apertures $30_{11}$ and $33_{11}$ each supplying a zero value of current, while the output circuits 81 and 82 have a voltage supplied thereto in response to the sources 76 associated with the apertures $31_{11}$ and $32_{11}$ each supplying an input current.

At the termination of the interrogation portion of circuit operation, the source 45 supplies a reset current pulse to the reset windings 44 coupled to each of the cores 10 through 13. The winding 44 associated with the cores 10, 12 and 13 has no effect as these cores are already saturated in the reset direction. The energized winding 44 coupled to the core 11, however, does switch two units of flux in each of the members 22, 20 and 20'. The core 11 is thereby reset to its initial magnetization condition illustrated in FIG. 2, and the FIG. 1 arrangement is then in the proper condition to initiate a new cycle of operation.

Up to this point, no mention of the operation or function of the control apertures 35 and the control windings 70 has been made. These elements are not essential to circuit operation but are provided solely to ensure that equal units of flux and flux changes are produced in each half of each of the cross legs 22 such that equal amounts of quiescent, biasing flux pass on either side of each of the apertures 30 through 33. As is apparent from the above discussion, equal flux changes are required to produce a zero output when the signal winding 72 coupled to an aperture is unenergized. Examining the aperture 35 and the short-circuited winding 70 in the right-hand cross leg 22 illustrated in FIG. 2, assume, for example, that a larger amount of flux tried to flow downward to the left of the aperture 35 than to the right of this aperture. Because the flux changes are unequal, and as the winding 70 is coupled to the material on either side of aperture 35 in an opposite polarity, a current shown by the arrow 36 in FIG. 2 is induced in the winding 70 which, by Lenz' law, is in a direction to oppose the flux change which created it. Hence, the current generates a magnetomotive force which opposes the flux increase to the left of the aperture 35 and aids the flux increase to the right of the aperture 35, thus creating a balanced flux condition. Similarly, the control windings 70 and control apertures 35 included in the cross legs 22 of each of the cores 10 through 13 perform an identical function.

For a similar reason the outer extremities of the rectangular core apertures formed by the driving legs 20 and 20' with the shunt legs 21 and 21', respectively, are made colinear with the centers of the signal apertures 30 through 33. This symmetry also aids the balancing of flux in the cross legs 22.

Only one of the driving legs 20 and 20' and an associated one of the shunt legs 21 and 21' is, in fact, essential for circuit operation, and the redundant members may simply be replaced by a magnetic member having a like flux capacity as each of the cross legs 22. The selection winding coupled to the eliminated driving leg would, of course, be placed on the included driving leg. However, the two driving legs 20 and 20' and the two shunt legs 21 and 21' are employed in the illustrative embodiment shown in FIG. 1 simply to make the cores symmetrical and thereby enhance the balancing of flux through the cross legs 22 associated therewith.

In addition, it is by no means essential to the operation of the present invention that equal flux capacities and therefore equal units of flux be employed in the driving legs and shunt legs. For example, if the flux capacities of the cross, driving and shunt legs were $m$, $k$ and $m$-$k$ units, respectively, where $m$ is greater than $k$, and the driving legs were initially set with $k$ units of flux, and the cross legs biased with $m$ units of flux then the shunt legs would contain $m$-$k$ quiescent flux units. Then, when the selection winding reverses the orientation of the $k$ flux units contained in the driving legs, the orientation of $k$ units of flux in the cross legs would also have to reverse. In the special case where $m$ equals $k$, as employed in an application by E. E. Newhall, Ser. No. 580,542, filed Sept. 19, 1966, which is a continuation-in-part of the cofiled E. E. Newhall application Ser. No. 241,375, filed Nov. 30, 1962, now abandoned the shunt legs may be deleted. As in the mode of operation described hereinabove, the flux would be diminished uniformly around those apertures to which no input current was applied thereby yielding no net signal induced in the corresponding output winding, whereas a signal would be induced in the output windings associated with apertures coupled to energized input windings.

By employing driving legs with a small capacity, the net amount of flux reversed in the entire core decreases when the driving legs are driven between remanent conditions by the selection windings. If smaller magnitudes of flux are switched, the core dissipates less heat, as core heating is directly proportional to the flux switched therein. As is well known, a decrease in the heating of a magnetic core allows the core to be operated at a higher repetition rate, which is a desirable advantage. Under these conditions, however, the magnitude of the output signals would also decrease proportionally.

Summarizing, an illustrative magnetic core converging switch made in accordance with the principles of the present invention employs a plurality of ferromagnetic multiapertured cores. Each core includes two driving legs, each shunted by a magnetic member of a like flux-carrying capacity. Two cross legs are provided to complete a magnetic path which also includes the driving legs. Each cross leg member has a uniform flux capacity which is twice the magnitude of that possessed by each of the driving and shunt legs, and a plurality of apertures are centrally located along the long axis of each cross leg.

Coupled to each aperture is an input winding and an output winding which links the ferromagnetic material on each side of the aperture in an opposite polarity. Output windings respectively coupled to corresponding apertures on the cores are serially connected together to form a plurality of output circuits. Binary input information is manifested by the presence or absence of an input current supplied to a corresponding input winding.

Bias windings are provided to saturate each core to a remanent hysteresis state. One of the plurality of cores is interrogated by reversing the flux in both of its driving legs thereby creating a neutral magnetic condition in the cross leg members. A zero net output voltage is induced in an output winding, and thereby also in an output circuit, when the corresponding input winding is deenergized. Conversely, an output voltage is generated in an output winding, and the corresponding output circuit, associated with an energized input winding.

It is to be understood that the above-described arrangements are only illustrative of the application of the principles of the present invention. Numerous other arrangements may be devised by those skilled in the art without departing from the spirit and scope of the invention. For example, any method of selecting one of the plurality of ferromagnetic cores 10 through 13 including the selection arrangements described in the aforementioned E. E. Newhall applications, might well have been employed in place of the selection windings 46 through 49 and the selection current sources 40 through 43 illustrated in the FIG. 1 arrangement.

What is claimed is:

1. In combination in a magnetic core converging switch, a square loop ferromagnetic multiapertured core including cross leg means having a uniform flux capacity of 2A units and including a plurality of signal apertures located thereon, wherein A is any positive, real number, driving leg means having a flux capacity of A units completing a closed magnetic path through said cross leg means, shunt leg means having a flux capacity of A units connected in parallel with said driving leg means and forming an aperture therewith, a plurality of input windings and a plurality of output windings, each pair of windings including one of said input and one of said output windings being respectively associated with and passing through a different one of said signal apertures included in said cross leg means, each of said output windings being coupled to the ferromagnetic material of each side of its associated signal aperture in an opposite polarity.

2. A combination as in claim 1 further including a plurality of input current sources each connected to a different one of said input windings.

3. A combination as in claim 2 further including reset means for biasing each of said driving, shunt and cross leg means to a first, reset remanent hysteresis polarity, said reset means including a reset current source and a reset winding coupled to said cross leg means and connected to said reset current source, and means for switching said driving leg means to a remanent hysteresis orientation opposite to said reset flux polarity.

4. A combination as in claim 3 wherein said signal apertures are colinear forming a signal aperture axis, and further including means for constraining all changes in the magnitude of the flux stored in said cross leg means to be divided equally in the ferromagnetic material on each side of said cross leg signal apertures, said constraining means comprising a control aperture located on said signal aperture axis, and a short-circuited control winding passing through said control aperture and coupled to the ferromagnetic material on each side of said control aperture in an opposite polarity.

5. A combination as in claim 4 wherein the outer extremities of the aperture formed by said driving leg means and said shunt leg means coincide with said signal aperture axis.

6. In combination in a square loop, ferromagnetic core, a plurality of driving legs, a like plurality of cross legs, and a like plurality of shunt legs, said driving and cross legs being serially interconnected to form a closed magnetic path, each of said shunt legs being connected in parallel with a different one of said driving legs, said cross legs being characterized by linear longitudinal axes and including a plurality of signal apertures centrally located thereon.

7. A combination as in claim 6 wherein each of said driving legs, cross legs, and shunt legs are respectively characterized by flux-carrying capacities of $k$, $m$ and $m-k$ flux units, where $k$ and $m$ are real positive numbers.

8. A combination as in claim 7 further including a plurality of square loop, ferromagnetic cores each identical to said aforespecified core, a plurality of input and output windings, each pair of windings including one of said input and one of said output windings being respectively associated with and passing through a different one of said signal apertures included in said cross legs of each of said multiapertured cores, each of said output windings being coupled to the ferromagnetic material on each side of its associated aperture in an opposite polarity.

9. A combination as in claim 8 wherein the output windings of corresponding signal apertures included in said multiapertured cores are serially interconnected thereby forming a plurality of output circuits.

10. A combination as in claim 9 further including a plurality of input sources and an output utilization means, each of said input sources being connected to a different one of said input windings and said output utilization means being connected to each of said output circuits.

11. A combination as in claim 10 wherein each of said cross legs included in each of said multiapertured cores includes a control aperture centrally located on the associated one of said longitudinal axes of said cross legs and a short-circuited control winding passing through said control aperture and coupled to the ferromagnetic material on each side of said control aperture in an opposite polarity.

12. A combination as in claim 11 further including means for biasing each of said square loop, multiapertured cores to a reset remanent hysteresis polarity comprising a plurality of reset biasing windings each coupled to a different one of said cores, and a source of reset current, said reset windings being serially interconnected and further connected to said reset current source.

13. A combination as in claim 12 further including means for selectively switching one of said core driving legs from said reset remanent hysteresis polarity to the opposite remanent polarity.

14. In combination, a ferromagnetic member including first and second portions, means for completing a closed magnetic path through said member, means for changing the amount of remanent flux stored in said closed magnetic path, a signal aperture included in said magnetic member between said first and second portions thereof, and means constraining said first and second portions of said magnetic member located on either side of said signal aperture to change the flux stored therein at an equal rate including a control aperture distinct from said signal aperture located between said first and second portions of said magnetic member, and a control winding possessing a relatively low impedance passing through said control aperture and coupled to said first and said second member portions in an opposite polarity.

15. A combination as in claim 14 further comprising an input winding passing through said signal aperture, and an output winding passing through said aperture and coupled to said first and said second member portions in an opposite polarity.

16. In combination in a magnetic core converging switch, $k$ square loop, ferromagnetic, multiapertured cores, each of said cores including a driving leg, a shunt leg, and a cross leg, means connecting said driving leg to said cross leg thereby completing a closed magnetic path which includes said cross leg, said shunt leg being connected in parallel with said driving leg, $r$ apertures included in said cross leg included in each of said $k$ magnetic cores, wherein $k$ and $r$ are positive integers, $r \cdot k$ input windings each associated with and passing through a different one of said $r$ apertures included in each of said $k$ cores, and $r \cdot k$ output windings each associated with and passing through a different one of said $r \cdot k$ core apertures, each of said output windings being coupled to the ferromagnetic material on each side of its associated aperture in an opposite polarity, each of said $k$ ouput windings associated with a corresponding hole included in each of said $k$ cores being serially interconnected to form $r$ output circuits.

17. A combination as in claim 16 further comprising an output utilization means connected to each of said $r$ output circuits, and $r \cdot k$ input current sources each connected to a different one of said $r \cdot k$ input windings.

18. A combination as in claim 17 further comprising a bias and reset current source and $k$ reset windings for saturating each of said $k$ cores to a biasing remanent hysteresis orientation, each of said reset windings being coupled to a different one of said $k$ cross legs, said $k$ reset windings and said reset current source being serially interconnected, and means for switching said driving leg of a selected one of said $k$ cores from said biasing remanent orientation to the other hysteresis remanent polarity.

19. A combination as in claim 18 further including $k$ control apertures, each of said control apertures being centrally located on the longitudinal axis of a different one of said $k$ core cross legs, and $k$ short-circuited control windings, each of said control windings passing through a different one of said control apertures and coupled to the ferromagnetic material on each side of said apertures in an opposite polarity.

20. In combination, a square loop, ferromagnetic member, means for completing a closed magnetic path which includes said member, a signal aperture located in said magnetic member, an input winding coupled to said magnetic member and passing through said signal aperture, and an output winding passing through said signal aperture and coupled to the ferromagnetic material on each side of said aperture in an opposite polarity.

21. A combination as in claim 20 further including a current source connected to said input winding, and means for producing a flux change in said closed magnetic path.

22. A combination as in claim 21 further including means for constraining the ferromagnetic material on each side of said signal aperture to change the amount of flux stored therein at a like rate in response to a flux change in said path, said constraining means comprising a control aperture whose center is colinear with the center of said signal aperture included in said ferromagnetic member, and a control winding possessing a relatively low impedance passing through said control aperture and coupled to the ferromagnetic material on each side of said control aperture in an opposite polarity

References Cited

UNITED STATES PATENTS 3,112,409 11/1963 Engelbart ---------- 340—17.4

TERRELL W. FEARS, Primary Examiner